United States Patent [19]
Crane

[11] 3,999,007
[45] Dec. 21, 1976

[54] AIRCRAFT VISUAL APPROACH/LANDING REPRODUCER DEVICE AND SYSTEM

[76] Inventor: Carl Joseph Crane, Box 17745, San Antonio, Tex. 78217

[22] Filed: Oct. 9, 1975

[21] Appl. No.: 621,064

[52] U.S. Cl. .......................... 358/104; 343/6 TV; 343/5 LS; 343/5 GC; 358/103
[51] Int. Cl.² ........................................ H04M 7/18
[58] Field of Search ............... 178/DIG. 20, 6, 6.8; 35/10.2, 12; 343/6 TV, 6 R, 6 A, 5 LS, 5 GC; 235/150.22

[56] References Cited

UNITED STATES PATENTS

| | | | |
|---|---|---|---|
| 3,205,303 | 9/1965 | Bradley | 178/6.8 R |
| 3,521,228 | 6/1970 | Congleton | 340/27 |
| 3,580,996 | 5/1971 | Maxey | 178/6.8 |
| 3,605,083 | 9/1971 | Kramer | 340/27 NA |
| 3,668,622 | 6/1972 | Gammett | 340/27 R |

Primary Examiner—Robert L. Richardson
Assistant Examiner—Edward L. Coles

[57] ABSTRACT

A cockpit-mounted cathode ray tube presents to the pilot a visual equivalent of the approach/landing during obscure visibility of an aircraft which contains a miniature illuminated runway that is being "approached" by a video camera that reproduces the position and position changes of the aircraft with respect to the real runway. Ground-based instrument landing system elements are used to air derive radio information to secure the operation of the device.

5 Claims, 10 Drawing Figures

AIRCRAFT VISUAL APPROACH/LANDING REPRODUCER DEVICE AND SYSTEM

BACKGROUND OF THE INVENTION

1. Field of the Invention

The present invention provides the pilot of an aircraft in the approach/landing environment with a cathode ray tube display that is the equivalent of the normal clear weather visual cues noted by the pilot in the said environment. The cathode ray tube is a member of a closed-circuit television system wholly contained within the aircraft. The video camera of this system possesses the unique feature of being not only supported for 5 (or 6° of freedom but includes a "pinhole type" lens system to insure universal focus and adequate field of view of a miniature runway which is preferably illuminated by infrared, or near infrared light. The airborne self-contained closed-circuit system operates during a limited portion of the final approach to an instrument landing system (ILS) equipped runway of contemporary design (with added distance measuring equipment (DME)), or equally well with the proposed microwave landing system (MLS), or other compatible ground-based systems which define runway centerline and glide path information. The airborne self-contained system is accordingly an air-derived system which does not necessarily employ radar tracking or telemetering of ground and/or airborne devices. Furthermore, the system is devoid of complex electronic computer devices. This adds to its simplicity and reliability, which is very important to equipment of this type.

The video camera is supported on the miniature equivalent of a gantry crane so that the camera itself may be positioned with respect to the miniature landing runway in exact proportionate spatial dimensions that are taken by the aircraft itself in relation to the real runway upon which it is to land. Accordingly the pilot sees on the cathode ray tube display a black and white visual cue of the approach and landing comparable to that which he might observe during an actual twilight landing at the selected runway. It is a relatively simple matter for the aircraft flying under obscure visibility to be positioned, by aid of ground oscillators, on the final approach path to the runway after leaving the final approach fix. It is that part of the approach to landing and the landing itself (during which all aerodynamic parameters of the aircraft must change), namely the roundout and flare and touchdown which becomes a major burden on the pilot especially in the presence of turbulence and wind shears. This invention, accordingly, gives to the pilot the equivalent visual cues that he normally uses in a clear weather approach/landing. Meaningful normal visual cues are presented to the pilot which could tell the pilot to abort the landing and await better weather conditions at the runway.

2. Description of the Prior Art

Several attempts have been made to provide equivalent cues to the visual landing but none are complete and some fail by presenting unreal or distorted visual cues on the cathode ray tube. Other efforts parallel the simulator art and rely on radar tracking and the use of telemetering to transfer position of the aircraft being tracked to a ground simulator display after which this display is transmitted back to the aircraft for presentation on the cathode ray tube in front of the pilot.

U.S. Pat. No. 3,212,082, dated Oct. 12, 1965, entitled "Aircraft Approach and Landing System", issued to Donald W. Robinson, Jr. et at shows complex structure supporting camera means which involves a rotatable area of runways and in which an object of the invention states that it provides an approach and landing system in which ". . . the major portion of the system is ground-based, the airborne portion thereof comprising only a television receiver.' This is foreign to the instant invention. Furthermore, this patent discloses no means in which the rotation of the aircraft about its three axes, in addition to its position with respect to the runway, are combined to produce the visual cues of the instant invention. It is noted further that the airborne equipment of the patent to Robinson, et al ". . . includes a television screen 14 which may be fixed in the cockpit or which may if desired be rotatably supported for movement about a roll axis 16 extending longitudinally of the aircraft 18 and gyro-stabilized about said axis." The instant invention describes an airborne video camera with 6° of freedom (or five as will be described) which reproduces the movements of the aircraft in space as well as its rotation about its own axes. Another marked difference between the instant invention and the patent issued to Robinson is the use in the instant invention of one runway which is not mounted on a turntable as in the referenced patent, which of course is unnecessary and only adds to the complexity of the mechanism.

Reference is now made to U.S. Pat. No. 3,383,679, dated May 14, 1968, entitled "Visual Landing Simulator for Instrument Flying," issued to Roger P. Baird, Jr. in which the abstract of disclosure definetly points out that the invention relates to ". . . a simulating device for Instrument Landing Systems of the type which utilizes airborne television receievers in connection with ground-based model airport, TV camera, TV transmitter, radar and simulating device, all for providing blind-flying pilots with simulated views of their airport." This patent as noted requires elaborate radar tracking, the transfer of this information from the radar to the ground-based model of the landing area, and subsequently the broadcasting of this information to an aircraft in flight, which is in great variance with the instant invention.

The patent to Baird shows means only for positioning the TV camera with respect to the landing area but does not rotate the camera about the three axes of rotation to which the aircraft is submitted during an approach/landing. In this patent to Baird it is noted that an ". . . airspeed indicator 34, and artificial horizon 33, mounted at top of pilot's instrument panel, in near view of my TV screen indicator to aid pilots in ease of seeing required information for making instrument approach and landings." Indicates that roll and pitch information is separately displayed near the cathode ray tube or TV screen. Unless the TV camera is rotated in response to the pitch and roll and heading of the real airplane, a false picture of the approach/landing will be generated. Due to the fact that the TV camera is positioned at a substantially short finite distance to the landing model, a spurious picture will be presented that is not the equivalent of the pilot's view of the distant horizon (at infinity) as seen in flight.

Neither the patent to Baird nor the patent to Robinson show the horizon, ground, sky background as provided in the instant invention. Although Robinson shows a pictorial rendition of this, the horizon being fixed in the model will not produce the equivalent of the real world portrayal.

In U.S. Pat. No. 2,979,832, dated April 11, 1961, entitled "Visual Simulator for Flight Training Device." Issued to Wolfgang B. Klemperer, there is shown a gantry crane type of support for positioning a camera in vicinity of a model airport for later projection of the picture in a ground-base simulator. This patent therefore bears no relationship to the methods provided in the instant invention.

SUMMARY OF THE INVENTION

In order to evaluate the deficiencies of some of the prior art, and in order to understand clearly what the pilot sees on the video screen in the instant invention, reference can be made to an example in which a video camera is fixed within the cockpit of an airplane near the pilot's eye position and is activated to make a video tape of an approach to a runway for landing. Assume that this video tape was made of an approach/landing to a light-colored concrete runway located in a brown sandy area with few landmarks in the near vicinity of the runway. The video tape picture would be made at twilight with runway lights visible and with the sky background plainly discernible including the horizon. If the approach/landing were made in a normal manner while following, say, a 3° glide slope, the video tape picture when projected on screen or a cathode ray tube would show the same essential features that the pilot saw during the normal approach in good visibility.

In the instant invention a miniature runway, the length of which can be varied, is utilized in order that a suitably disposed video camera may take a picture of the camera's approach to the miniature runway in angular, distance and velocity proportion to the movement and position of the real airplane. Accordingly it is an object of the instant invention to support a video camera for 6° (or 5°) of freedom in the vicinity of a miniature runway and then to insure that the video camera's movement in roll, pitch and yaw about the optical axis of the camera matches in degree and rate the corresponding movements of the supporting aircraft in all its angular and linear positions and changes of position and its ground speed and drift as it approaches the real runway. Accordingly the camera must move proportionately in the vertical plane and in a horizontal plane to match the relative movement of the supporting aircraft as it tracks the glide slope beam and the localizer beam. As the supporting aircraft moves in the vertical plane the pilot would normally see the far horizon slowly move down until as the airplane touches down on the runway the horizon appears to meet the extended far edge of the runway. It is therefore important to have a well defined horizon line delineated on a background screen off the far end of the miniature runway in order that the visual cue derived by the video camera will precisely repeat the pilot's eye cue just noted. In the instant invention this requires that the horizon delineated on the background screen must match the vertical movement of the video camera in height as well as in its changes in height above the runway as the video camera approaches the touchdown point on the runway. The instant invention plans the activation of the approach/landing visual cue on the video screen (CRT) when the supporting aircraft has reached a point about three miles from the threshold of the runway, although other distances could be selected.

The pilot of the airplane may desire to use a variety of special indicating instruments such as separate flight detectors, airspeed indicators, altimeters and the like for en route reference while preserving the CRT display only for the final approach and landing. On the other hand, the pilot may desire to use an integrated flight display for presentation on the CRT which is derived from an instrument such as is described in my U.S. Pat. No. 3,307,191, dated Feb. 28, 1967, entitled "Aircraft Blind Landing Device and Flight Director System." This latter display may be switched on to the CRT at all times that the display from the instant invention is not in use.

Accordingly a principal object of my invention is to derive and present on a CRT, for aircraft pilot use, the equivalent visual cue of a pilot's seen view of the approach/landing as viewed from the aircraft cockpit during good visbility. The runway and its environment may be devoid of great detail including only helpful objects, some of which give perspective and indicate height-above-touchdown impression, and give visual information of departure from the proper glide path.

This objective may be achieved by use of the CRT for the sole purpose of presenting the final approach display. It may also be desirable to use the same CRT for display of en route guidance and control, or for weather information such as weather maps. Accordingly another object of my invention is to alternately display aircraft guidance and control and/or weather information on the CRT until such time on the final approach that the visual reproduction of landing cues is needed by the pilot.

Contemporary flight data display devices, whether portrayed on a CRT or by other instruments, are at best destorted or incomplete presentations of scales and pointers that do not potray the seen view through the windshield. Frequently, a pilot is required to visually and mentally "synthesize" several instrument indications in order to attain a mental picture of the aircraft's orientation in space and/or with respect to the runway.

It is well known that a person may be taught to safely fly an airplane (take off and land) after twelve hours of instruction. It is also well known that federal regulations still require the professional air carrier pilot to see the landing environment during a low-visibility landing.

This see-to-land phenomena accordingly provides the pilot with an infinite number of instantaneous cues all integrated into the picture seen through the windshield which makes the visual reference landing superior to all other instrumented cues. This result is reproduced in the instant invention.

Another object of this invention is to present a corrected intergration of roll/pitch/yaw in the display on the CRT. With the exception of the display of roll/pitch/yaw as notted in my U.S. Pat. No. 3,307,191 referenced above there is no art that recognizes the biological phenomena of apparent roll reversal of contemporary bank indicators when seen by the eye-brain combination of the pilot while flying in the subjective environment of obscure visibility. To accomplish this objective in the instant invention the video camera is subjected only to five degrees of freedom, namely:

1. Motion in vertical plane, up or down
2. Motion in vertical plane, fore and aft
3. Motion in horizontal plane, left or right
4. Motion in yaw, left or right
5. Motion in pitch, up or down In order to prevent information of roll, left or right, a (rotable) mask is positioned immediately ahead of the vidicon tube. The mask has a substantially rectangular opening through which the view ahead is framed. The framed image on the vidicon represents the windshield frame of the airplane and as it rolls, left or right, presents roll effect to the pilot on the CRT. This permits the pilot to view an image of the horizon on the CRT that never appears to roll left or right. This paradox as seen in contemporary artifical horizons while the pilot is flying in obscure visibility is the cause of much vertigo, and also prevents a visual integration of roll, pitch and yaw which results in separated indicators for yaw and for roll/pitch.

Therefore the instant invention presents on a CRT a reproduction of the essential view that would be seen by the pilot of the airplane in the approach/landing environment if unhampered by obscure visibility, modulated or corrected for the visual roll anomaly to present a fixed real world reference.

Nothing in structure or purpose of the instant invention can be construed to relate to simulator art. In the instant invention nothing is being simulated. This invention is an airborne reproducer of the position in miniature of the aircraft being flown in the approach/landing environment. The visual reproduction on the CRT seen by the pilot is the actual equivalent to the pilot's eye view of the approach/landing which may be obscured.

DESCRIPTION OF THE PREFERRED EMBODIMENTS

Figure 1:
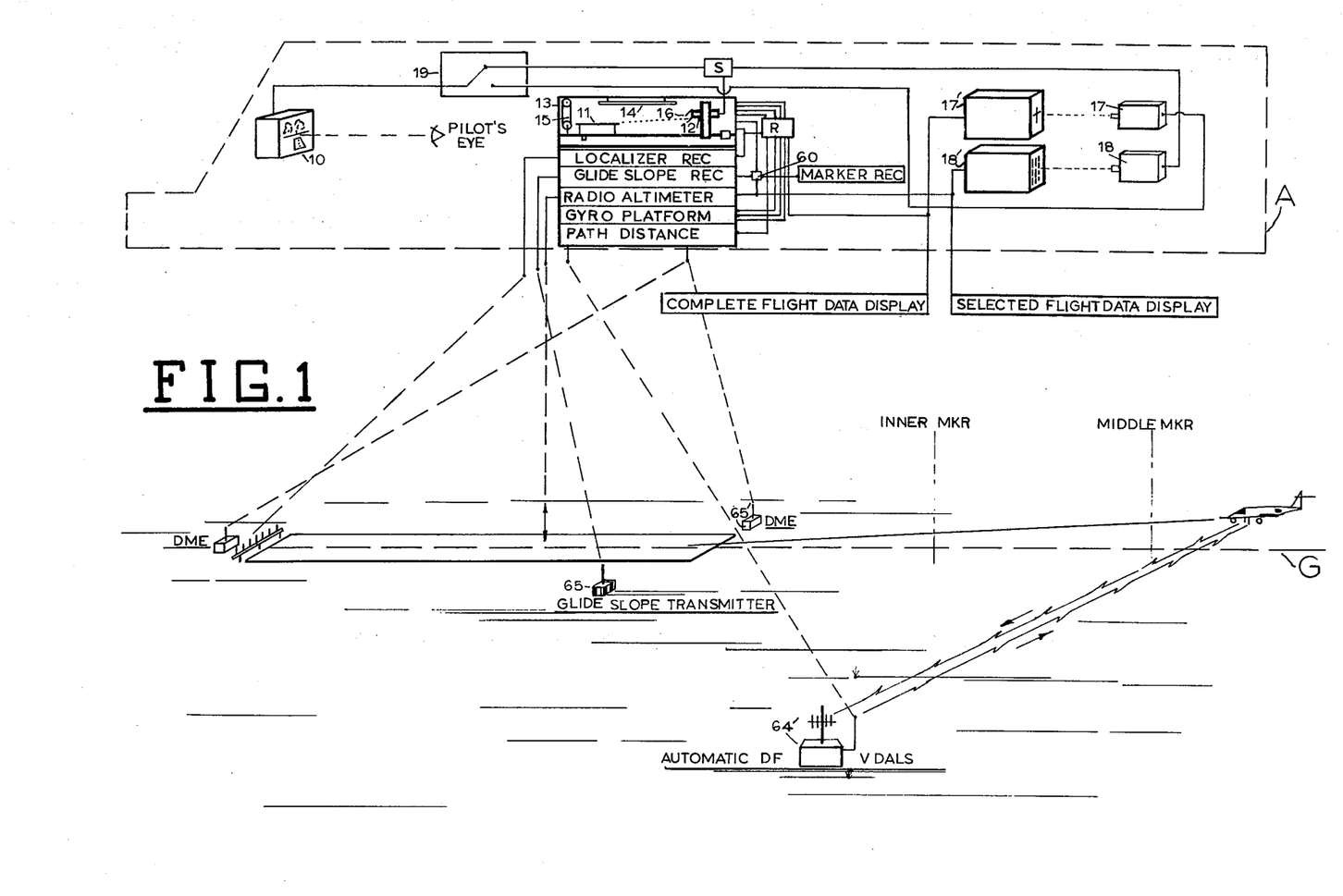
FIG. 1 depicts a schematic arrangement of the elements embodied in the aircraft as well as on the ground which taken all together are essential to the operation of the airborne Visual Apprach/Landing Reproducer System.

Reference is made to FIG. 1 in which is shown in schematic form the essential details of the invention. The closed dashed line A represents the aircraft in flight which is receiving navigational information from the radio devices located on the ground in the vicinity of the runway, the centerline extended of which is represented by the dashed line G. The cathode ray tube (CRT) 10 displays in pictorial form the pilot's view of the runway 11 which is being transmitted by the video camera 12 as the camera moves toward the miniature runway 11. The video camera 12 moves in response to various radio signals from the ground that are received in the aircraft as shown in FIG. 1 The cabinet 13 which contains the miniature runway 11 is a sealed container which is equipped with a light source 14 for illuminating the runway 11 and associated minutiae which includes an endless belt screen 15 upon which is displayed a characteristic view normally seen by the pilot beyond the runway as he approached for a landing. The body of the camera is equipped with two associated first surface mirrors (optical system) 16 which perform the function of a miniature periscope in order to lower the optical axis of the camera into the close proximity of the miniature runway 11. The motion of the aircraft with respect to the real runway that is being approached is reproduced in proportionate value by the motion of the video camera. The optical axis of the video camera rotates about the axis of the lower mirror both in yaw and in pitch. The video camera body does not rotate about a roll axis. The video camera is equipped with a pinhole "lens," 89.

The ground equipment that serves to transmit information to associated receivers within thhe aircraft consists of the elements of the contemporary instrument landing system (ILS) with the addition of ground-based distance measuring equipment (DME) transponders and/or an automatic Doppler type direction finder (DF) modified for automatic tracking of the approaching aircraft. Other ground-based systems such as the compatible microwave landing system (MLS) or other systems which define the centerline axis of the runway and associated glide path may also be used to transmit information to appropriate airborne receivers that locate the position of the aircraft continuously in its approach and landing. The ground-based radio equipment described above is well known in the art and requires no further description except as will later be explained. In FIG. 1 it will be noted that additional video cameras 17 and 18 are focused on separate instrument groups and may be provided in order to remotely display on the CRT 10 alternate information provided by instrument consoles 17' and 18'. The switch 19 is designed to simultaneously select a pictorial presentation being scanned by the moving video camera 12 and selected flight data display information being scanned by the video camera 18 by means of the switcher S, or by movement of the switch 19, contained in the control unit of FIG. 4, the information presented by the instrument console 17' as selected by the pilot. The purpose of the switcher S is to mix the information portrayed on the instrument console 18' with the pictorial presentation that is being displayed on the CRT 10. This additional digital type of information would normally be that related to airspeed and radio altitude and may include heading information in digital form. The function of the switches is to overlay needed digital information on the CRT.

Throughout the various figures all individual showing of detailed circuitry is eliminated as this type of circuitry is well known in the art and graphically displaying it in the figures will tend to cause crowding. Accordingly, the essential circuitry is shown simply by lines interconnecting the essential elements of the invention.

From the foregoing it will be seen, particularly in FIG. 1, that use is made of closed circuit television equipment to provide the selected visual cues for the pilot on the CRT in the pilot's cockpit. In the actual utilization of the preferred form shown the pilot using the selector switches of FIG. 4, which operate control relays in the relay box R, while flying en route into the terminal area will have selected and will be using the en route display shown on the complete flight data display console 17'.

In this complete flight data display of console 17' will be seen an indication of distance (DME) from the DME transponder 65' located at the threshold of the runway. When the pilot notes that he has reached the three-mile position from the threshold he will use the selected switch L on his control panel which will cause relays in the relay box R to disconnect the complete flight data display from his cockpit CRT and at this time connect the display on the CRT that is now coming from the video camera 12 of the reproducer. The information of distance being received in the airborne DME receiver will now be shifted to the DME converter of FIG. 8 and its interconnected remote positioner (Vernitron TORQSYN) 20 which will serve to energize the drive mechanism 20' (FIG. 7), which positions the longitudinal linear location of the video camera 12 with respect to the runway threshold. At the same time that the CRT in the cockpit is connected to the video camera 12, the circuitry in the relay box R (FIG. 1) transfers information from the selected flight data display 18' through its associated video cameras 18 and through the switcher S to mix the digital information such as air speed, radio altitude and heading with cues being shown on the pilot's CRT display. Simultaneously with the beginning operation of the reproducer system and linear movement of the video camera 12 the other movements of the camera are instituted by energizing the circuitry from the localizer receiver, glide slope receiver and gyro platform in order to continuously position the video camera 12 of the reproducer. The snychro outputs from the gyro platform are now controlling the video camera 12 in pitch and yaw, as well as securing movement of the roll reticule 21 of FIG. 9. These movements just mentioned are obtained by the electrical interconnection of the three synchros of the gyro platform with the Vernitron TORQSYN 22 of FIG. 6 for pitch control, the TORQSYN 23 of FIG. 6 for yaw control, and the TORQSYN 24 of FIG. 6 and FIG. 7 and FIG. 9 for roll control.

Figures 5, 6, 7, 8, 9, 10:
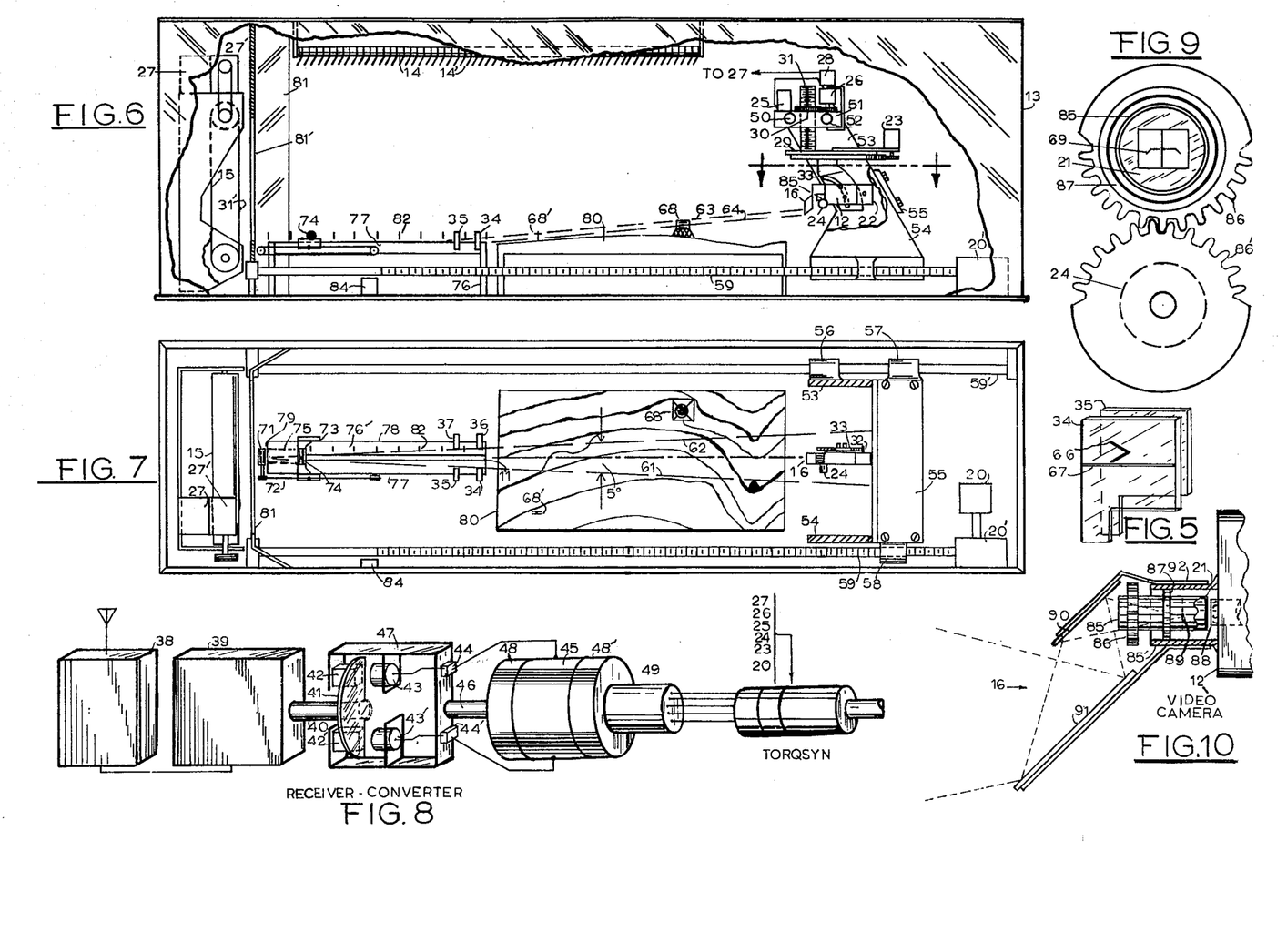
FIG. 5 shows the pilot's view of the visual approach slope indicator used by the pilot to determine position of the aircraft with respect to the glide slope path and as potrayed indicates that he is high on the glide path since the V-bar is riding high against the horizontal bar indicator.
FIG. 6 is a vertical view, substantially to scale, of the Visual Approach/Landing Reproducer, being a partly cut-away view to shows the mechanism which would normally be enclosed in a boxlike structure.
FIG. 7 is a plan view, substantially to scale, of the Visual Approach/Landing Reproducer, being a view with the upper lid of the boxlike structure removed, and containing a partial section of the video camera mount.
FIG. 8 is a schematic view showing the photoelectric and mechanical arrangement (converter) that is used to sense position of the aircraft and to synchronize related position of the video camera with respect to the miniature runway of the instant invention.
FIG. 9 is a partial presentation of the mechanical arrangement which converts roll information of the aircraft to a reticule interposed between the video camera lens (pinhole) and the vidicon tube in order to convey visual roll information to the pilot.
FIG. 10 is a further partial presentation in part section to show operational detail of the optical system and the reticule tube mounting.

The Vernitron TORQSYN positioner consists of a control transformer synchro, a demodulator, a stabilization network, a DC amplifier and driver, as well as a DC torque motor. This proprietary item generally simplifies the remote positioning of the video camera 12 and the endless belt screen 15 and also serves to position the video camera 12 laterally in response to localizer receiver information and vertically in response to glide slope receiver information by energizing the TORQSYN unit 25 which drives the camera laterally and the TORQSYN unit 26 which drives the camera vertically (FIG. 6). The TORQSYN 27 connected to drive mechanism of the endless belt screen 15 of FIG. 6 is actuated by the synchro 28 which is mechanically connected to the drive shaft of the TORQSYN 26 of FIG. 6 which latter raises or lowers the camera support plate 29 by means of the pinion gear on the shaft of TORQSYN 26 and the internally threaded gear 30 which drives the splined and threaded shaft 31 up or down to insure that the video camera 12 reproduces the motion of the aircraft with respect to the glide path which is being followed by the aircraft. It can be seen therefore that the position of the real aircraft with respect to the glide slope it is following is reproduced proportionately and in miniature by the video camera 12 by the mechanism just described. It is important to note that as the video camera, following the glide path to the miniature runway, becomes lower as the camera approaches the threshold, the horizon line 31' delineated on the endless belt 15 must be lowered in order that it retains the same height above the miniature runway that is attained by the optical center of the mirror system 16 of the video camera 12. This combined vertical movement of video camera and delineated horizon line of the endless belt provides the visual reference on the CRT that the pilot uses to attain or maintain the correct pitch angle of the aircraft with respect to the horizon of the real world. Should the aircraft drop below the glide path the pilot could regain the glide path by an upward pitch of the aircraft axis. This upward pitch would be detected by the vertical gyro platform which would energize the TORQSYN 22, the pinion gear 32 of which (FIG. 7) engages the curved rack 33 of the pitch plate.

Figure 2:
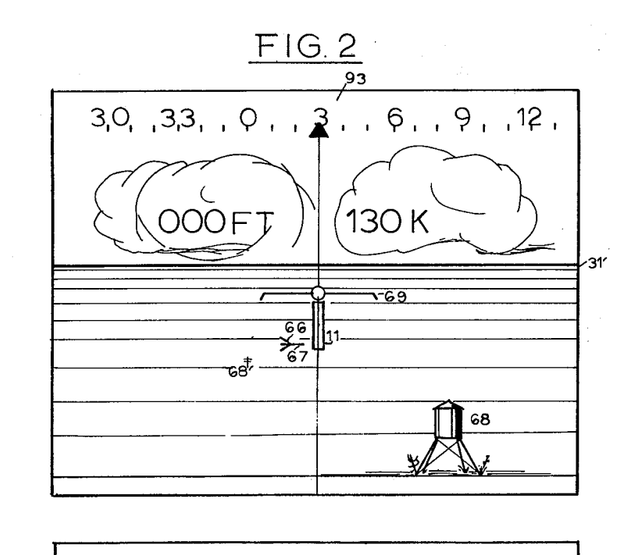
FIG. 2 shows one of an infinite variety of instantaneous visual cues depicted on the cathode ray tube (CRT) which as shown indicates the instantaneous view from the approximate 3-mile distance to the threshold with the aircraft being aligned with the runway centerline and also positioned on the glide slope path.
Figure 3:
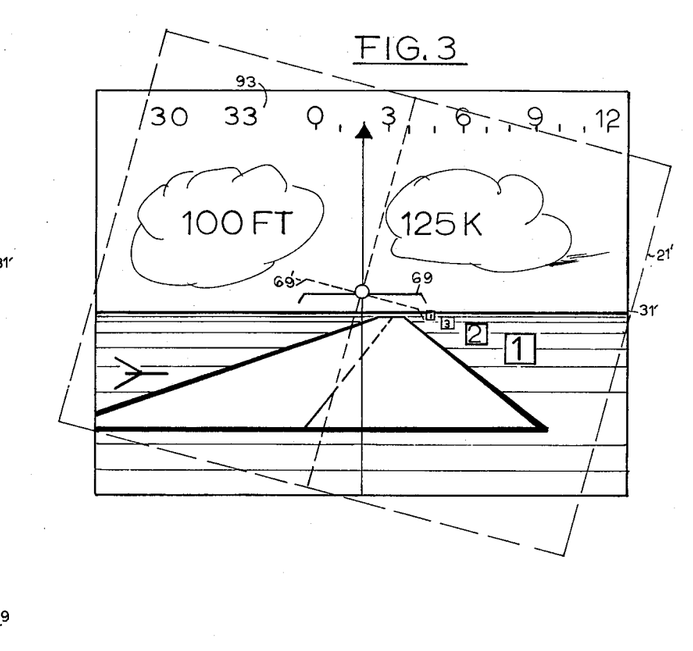
FIG. 3 shows another of an infinite variety of instantaneous visual cues depicted on the CRT which as shown indicates the instantaneous view from the approximate position midway between the inner marker and the threshold of the runway with the aircraft in this case in a position slightly (one-half dot) to the right of the centerline of the runway but aligned perfectly with the glide slope path established for the particular runway.

A pilot viewing the CRT display determines the position of the real aircraft with respect to the glide pth by viewing the visual approach slope indicator (VASI) boxes 35, 35, 36 and 37 of FIG. 6 and FIG. 7, located both right and left off the runway near the runway threshold, which boxes contain a V-bar and a horizontal bar. The VASI boxes are made completely of transparent material such as glass or plastic and are positioned as shown in the figures so that if the pilot maintains the aircraft position on the selected glide path he will see that the V-bar 66 and the horizontal bar 67 are in alignment as shown in FIG. 2 and FIG. 3, but if the aircraft is high on the glide path and therefore the video camera 12 is correspondingly high the pilot will see this in the form shown in FIG. 5 which is the way the video camera would observe it, and consequently the way the display on the CRT would appear. Variations above or below the glide path would produce corresponding variations of the V-bar and horizontal bar. It will be noted in FIG. 4 that the pilot has a means of setting a glide slope angle which must correspond with the actual glide slope angle of the ILS on which the aircraft is operating. This he determines by reference to his approach plates. When the pilot sets the selected glide path angle through electrical means not shown, the horizontal bar of one of the VASI boxes on each side of the runway is raised or lowered by servomotor drive to insure that the correct angle is displayed to the video camera for projecting on to the CRT in the cockpit. This system of using VASI boxes, to indicate glide path position, may be enhanced by including a glide slope indication in the selected flight data display console so that the image of this indication would be mixed with the approach cues seen on the CRT.

In order to understand the method of positioning the video camera laterally in response to received localizer signals reference is made to FIG. 8 in which the localizer receiver 38 provides an output to the zero-center microammeter 39 the indicating shaft 40 of which is bonded to a shutter 41 of essentially semicircular form and opaque to the passage of light. This shutter 41 is interposed, in the zero position of the microammeter, between cooperating lamp 42 and photocell 43 and also between cooperating lamp 42' and associated photocell 43'. When no displacement signal is being sensed by the microammeter 39 (aircraft on centerline of localizer path) the shutter 41 prevents light from both lamps 42 and 42' reaching the photocells 43 and 43'. Each of the photocells 43 and 43' is electrically connected to relays 44 and 44' in such a manner that if either is activated, through suitable circuitry, the electric motor 45 will be energized to cause rotation of shaft 46. The shaft 46 is fixedly attached to the support frame 47 made of plastic or metal which supports the lamps and photocells and relays jut mentioned. When the motor 45 is activated as noted above (48 and 48' are gear reducers) the shaft 46 positions the frame 47 in such manner that the light reaching an associated photocell is blocked and the motor is braked to a stop. Accordingly this new zero position leaves the shaft of the motor 46 in a new position and also the synchro 49 in a new position which represents the displaced position of the video camera laterally, by means of the electrical connection between the synchro 49 and the remote particular TORQSYN element 25, the shaft of which is connected, by its associated pinion gear, to the rack gear which is an integral part of the slide member 50 (FIG. 6 and FIG. 7) which supports the table 51 which moves laterally in response to received localizer signals as noted. A second slide member 52 like member 50 provides a suitable and accurate guide for movement of the table 51. The slide member 50 has a key way cut in such a manner that the rack gear mentioned above is fastened submerged in the key way so that the ball bushings, not shown, which slidably support the table 51 will clear the teeth of the rack. Upright members 53 and 54 fixedly contain both ends of the members 50 and 52 (FIG. 6 and FIG. 7). The upright members 53 and 54 are held in rigid position by the plate 55 (FIG. 6 and FIG. 7) by means of the four attaching studs shown in the figures. It will be noted that the upright member 53 is fitted to its base with two ball bushings 56 and 57, which engage the rod 59', to provide friction-free and accurate movement of the entire structure which supports the video camera. In order to accomplish the linear longitudinal motion of the support structure a ball screw 58 supports the structure on the lead screw 59. The lead screw 59 is rotated by the interconnecting mechanism 20' which is driven by the TORQSYN remote positioner 20 which as mentioned above is energized response to path distance, such as DME.

The description just provided for the structure shown in FIG. 8 relates actually to a converter mechanism for converting the received signal read out on a meter mechanism to drive mechanism for positioning purposes. This same converter mechanism is utilized not only to position the video camera in response to the received localizer signal but is also used for the purpose of positioning the camera's location vertically and longitudinally as well as laterally. As will be described later the vertical positioning of the video camera during the initial operation of the approach to the runway is sensed to the glide slope signal. However when the camera reaches a position near the threshold at the location of the inner marker transmitter it is the energy from the marker that triggers a relay in the relay box 60 of FIG. 1 so that now the radio altitude element provides the sensing of height above touchdown on the runway. This is necessary since the landing aircraft may overshoot the position of the glide slope transmitter as shown in FIG. 1 which would eliminate vertical movement of the video camera.

As the aircraft passes the middle marker the energy received from it causes the off switching of DME (at threshold) transponder and the on switching of the DME transponder at the far end of the runway or the on switching of the automatic DF (VDALS) which tracks the aircraft to and along the runway with a high order of accuracy and transmits position information to the meter movement 39, FIG. 8 which continues to convert distance to and along the miniature runway to continue movement of the video camera.

Reference is now made to FIG. 7 in which are shown the radiating lines 61 and 62 which originate at the localizer transmitter and describe the five degree angle between the two lines that establishes the normal width of the localizer course. The lines 61 and 62 therefore are lines of equal signal strength (such as two-dot deflection) which if followed by the aircraft, and consequently reproduced by the video camera, would keep representing, laterally the video camera as it approaches the runway threshold.

In FIG. 6 the lines 63 and 64 represent the envelope boundary of the glide slope beam which is established by the glide slope transmitter 65 (FIG. 1). In the event that the aircraft rises or falls above or below the glide slope at the site of landing the video camera will correspondingly rise or fall in direct proportion so that what the video camera sees and displays on the CRT will be the visual equivalent of what the pilot would see from the cockpit of the airplane. As the video camera rises and falls so does the horizon line 31' delineated on the endless belt 15 keeping the relationship of the height of the optical system of the camera above the runway equal to the height of the horizon line above the runway by means of interconnected servomechanisms.

Refer now to FIG. 9 and FIG. 10 for an understanding of the method of presenting roll information visually to the pilot since the video camera is not moved bodily around the roll axis. Since the video camera does not move around the roll aix, the video picture it is showing on the CRT will always present the horizon view on the endless belt 15 as parallel to the cross-axis of the runway and other minutiae seen in the pictorial environment surrounding the runway as well as to the floor of the pilot's cockpit. When the human pilot views what appears to be the real world and the real runway as shown on the CRT, he will definitely not see the reproduced real world tilting about the roll axis but will see the real world in a level position laterally as in fact he does see it from the aircraft when flying in good visibility. In order to permit the pilot's eye-brain combination to properly sense the roll motion of the aircraft he is flying as it is portrayed on the CRT, the reticule 21 of FIG. 9 will be rolled either left or right so that the airplane symbol 69 will mimic the nose of the aircraft in flight and give the pilot a vertigo-free presentation similar to that shown in FIG. 3 by the dashed frame line 21° and the aircraft symbol 69'. This movement of the reticule 21 to portray the rolling motion of the aircraft is accomplished by rolling the reticule tube 85 (FIG. 10) by means of the synchro 24 (FIG. 9), the shaft of which is fixed to the gear 86° which meshes with the synchro tube gear 86. The gear 86 is pressed on to the reticule tube 85 and the latter is fitted with a pressed on needle bearing 87 which serves to provide friction-free rolling of the reticule 21 which is fixed to the reticule tube at a position in close proximity to the vidicon tube 88 of the camera. The tubular extension 85' of the camera body engages the outer race of the needle bearing 87. The pinhole "lens" 89 is shown in FIG. 10 which figure does not include the showing of the synchro-driven gear 86' that meshes with the gear 86. This structure is deleted in order to clearly present the two first-surfaced mirrors 90 and 91 which form the optical system 16 and provide for the lowering of the optical axis of the video camera 12. The two mirrors are supported on a tubular clamp bracket 92.

Figure 4:
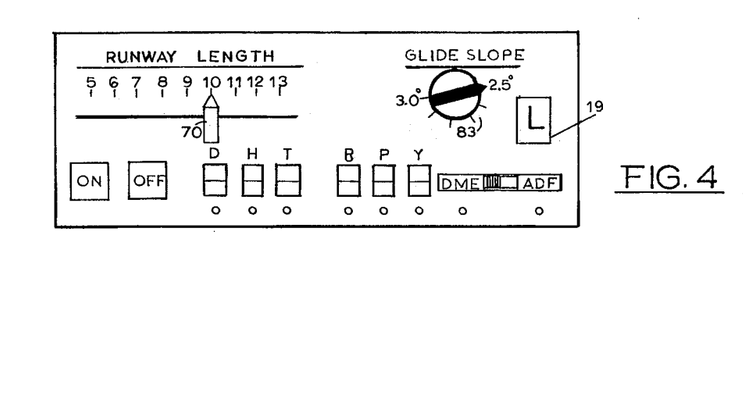
FIG. 4 shows a preferred form of the switchbox which the pilot must use to select the runway length and the glide slope angle of the runway of intended landing.

With further reference to FIG. 6, FIG. 7 and FIG. 4 it will be noted that the knob 70 is available to the pilot for setting the runway length of the runway that is being approached. Although not shown in the drawing, the movement of the knob 70 causes the rotation of the interconnected synchro which transmits positional information to the TORQSYN servomechanism 71 (FIG. 7) which by means of interconnecting sprocket and chain mechanism 72 causes the slide 73 to move to a position on the runway that will shorten the seen length of the runway to agree with the actual length of runway being approached by the aircraft. The spool 74 (FIG. 6) contains tape 75 of contrasting color to the runway which is payed out to cover that portion of the runway at the far end so that it cannot be seen. The framework 76 (FIG. 6) which supports the runway itself is a rectangular frame supported by four legs having side bars 77 and 78 and end bar 79 at the far end of the runway support, but no end bar at the approach end of the framework support. The runway consists of a lightly colored strip painted on or otherwise fastened to a thin rubber dam element 76' which is stretched across the top of the frame 76. That portion of the thin rubber dam lying outside the area of the runway is colored a contrasting color darker than the runway. In contrasting lighter colors, large numerals representing runway distance (FIG. 3) along the runway may be painted at intervals shown in FIG. 6 and FIG. 7 by the dashed lines 82 that appear at each thousand foot interval along the runway. The purpose of the thin rubber dam is to prevent damage to the optical system 16 of the video camera 12 in the event that it should strike the runway or the runway environs while setting or checking the operation of system hardware. Any number or type of pictorial representation of the ground surface in the vicinity of the miniature runway may be displayed on suitable frames such as frame 80 which supports the water tower 68 and the telephone 68' in order to provide additional positional landmarks of use to a pilot while flying an approach to a runway. Additionally, a masking screen 81 is placed between the endless belt 15, which portrays the seen view of the horizon and land and cloudscape, and the far end of the runway. Although not shown in the drawings of FIG. 6 and FIG. 7 additional pictorial props may be erected on the side of the cabinet 13 in order to provide side pictorial views of the walls, for instance, of a valley through which the distant sky and landscape is seen. The light source 14 is provided with louvers 14' to eliminate as far as possible direct overhead glare reaching the optical system 16 of the video camera 12. The masking screen 81 is provided with a cutout 81' to permit the viewing of the horizon portrayal while blanking out the mechanism that lies outside of the pictorial presentation of the endless belt 15.

Refer now to FIG. 4 in which is shown the knob 83 which may be used by the pilot to set the glide slope angle on the dial which represents the actual glide path of the aircraft approaching the runway. The knob 83 is connected to a synchro motor which has the purpose of transmitting the correct angular position to the servomechanism, not shown, which raises or lowers the V-bar of FIG. 5 which visually presents to the pilot on the CRT the proper visual reference in order to follow the proper glide path as further described above. While no mechanism is shown in FIG. 4 or elsewhere to show the means for testing the various servomechanism that serve to move the video camera 12 and the reticule 21, the several rocker switch buttons shown in FIG. 4 have the purpose of test switches. In addition to the switch for turning on or off the power supply to the mechanism the switch T has the purpose of moving the video camera laterally left or right to determine if operation is satisfactory. In a like manner the switch D will move the camera position to or away from the threshold for a similar purpose of test, and the switch H has the purpose of raising or lowering the video camera. In a similar manner for test purposes the switch B will check the roll axis by banking the reticule 21 either right or left, and in like manner the switch P will check the pitch movement of the video camera up or down as will the switch Y check the operation of the camera in yaw to the left or to the right. All the switches except the on and off switch are momentary double throw switches for checking the circuitry just described. When the switches are not activated the video camera and its associated drive mechanism will permit the video camera to position itself at its normal 3-mile standby position with all axes in neutral. A further precaution that is taken is that any time any axis of the video camera exceeds an angle of thirty degrees the image on the CRT will revert automatically to the en route presentation shown at 17' which is the complete flight data display. This precaution is taken so that any marked deviation of the aircraft from a normal approach to landing will cancel out the reproducer display immediately signaling the pilot that he should go around by reference to the complete flight data display. In like manner, should the aircraft during the rollout operation progress along the runway to the extreme far end of it the limit switch 84 (FIG. 6 and FIG. 7) will be activated by the ball screw 58 housing which will immediately return the video camera 12 to its standby position at the three-mile starting point, and simultaneously present the en route presentation on the CRT.

Refer now to FIG. 2 and FIG. 3. In FIG. 2 is shown the approximate visual cue that the pilot would see as the reproducer begins to function and displays on the CRT the distant view of the runway 030. It will be noted that the reticule 21 contains a vertical line as well as the horizontal symbol of an aircraft flying away from the observer. If the aircraft was in level flight the aircraft symbol would be positioned on the horizon line 31'. Accordingly in FIG. 2 the aircraft is in a slight nosedown glide on a heading of 30°, as shown on the heading scale 93, and the reproducer indicates this as shown. It will also be noted that the aircraft symbol is positioned above the centerline of the miniature runway which reproduces the same position of the aircraft with respect to the real runway. It will also be noted that the aircraft is on the proper glide path as the V-bar 66 is coincidental with the horizontal bar 67. Also it will be noted that the water tower 68 displayed in FIG. 6 and FIG. 7 is shown on the CRT in the immediate foreground of the presentation, which gives the pilot visual position information of distance from the threshold. Pictured in the upper part of the display will be information of radio altitude and airspeed which is being received through the mixing switcher S from selected flight data display console 18' and is shown in FIG. 2 as "0 feet" and "130 knots" because height above touchdown will not be indicated until the aircraft selectively reaches either the middle or inner marker position. In FIG. 3 the display indicates that the aircraft has reached the inner marker and is indicating "100 feet" above touchdown while the airspeed is now reading "125 knots." It will be noted also that the presentation indicates the nearness of the aircraft to the threshold and further indicates that it is slightly right of the centerline but is holding a 20° heading in order to correct for the slight displacement right of the centerline. The heading information like that for radio altitude and air speed is being transmitted from the selected flight data display console 18' as transmitted through the mixer S via the video camera 18. As soon as the aircraft reaches a position over the centerline of the runway, the presentation will show this and the pilot will direct the aircraft back to the heading of the runway, namely 030, which assumes the absence of a crosswind component affecting the approaching aircraft. This maneuver of banking the aircraft to the right in order to recover the 30° heading is shown in FIG. 3 by the tilted frame 21' of the reticule as indicated by the dashed line presentation of the reticule overlaying the rest of the figure. It should be well understood that the presentation on the CRT is a proportionate integrated visual equivalent seen by the pilot of the almost infinite number of instantaneous positions that the aircraft may take in its approach to touchdown. It is the integration of the multiplicity of instantaneous positions, rates, angles, and perspectives that the pilot normally perceives that can be presented on the CRT in exact proportions without distortion. This is the essence of the instant invention.

By rolling the reticule 21 instead of rolling the camera in response to roll of the aircraft, vertigo is eliminated and the presentation is corrected for the subjective world of obscure visibility flight.

The receiver and converter mechanism of FIG. 8 is common to the various receivers of electronic signals as indicated in FIG. 1.

The automatic direction finder system (VDALS) 64' as described above is the operational equivalent of the dual ground-based DME transponders at the threshold and at the far end of the runway as shown in FIG. 1. Additionally, the transmission of the automatic DF 64' can be voice-modulated to provide the pilot during approach/landing with information of distance to the threshold as well as recommended height above touchdown at the distance reported.

What I claim is:

1. An airborne visual approach/landing reproducer device and system comprising a miniature runway fixed within the aircraft, an endless belt with horizon line and cloudspace depicted thereon positioned beyond the far end of the said miniature runway, a video camera mounted for multiple degrees of freedom in proximity to the said miniature runway, means for positioning the video camera proportionately and in exact scalar value to the position and movements of the said aircraft with respect to its selected ground-based runway, gyro means for tilting the video camera about its three axes that correspond to the tilt of the said aircraft about its axes of roll, pitch and yaw, airborne electronic receivers responsive to ground transmitters that define runway longitudinal axis, glide slope axis, path distance to and along the said ground runway, marker beacon, a radio altimeter, a navigational transceiver, electrical, electronic, and photoelectric circuitry interconnecting the said video camera drive means for positioning the said video camera, a cathode ray tube for presenting to the aircraft pilot the imagery detected by the aid video camera as it approaches the said miniature airborne runway and means for raising or lowering the said horizon line in unison with the raising and lowering of the said video camera, and additional video cameras located within the said aircraft for focusing on installed instruments, and switching means for selecting and/or mixing one or the other of said additional video camera outputs through closed circuitry connecting the said cathode ray tube visible to the pilot of the said aircraft.

2. The approach/landing reproducer device and system defined in claim 1, employing a controlled mobile video camera arranged for movement in pitch and in yaw and having a reticule located substantially at the focal plane of the lens of the video camera, the said reticule arranged for rotational movement, and servomechanism means geared to the said reticule made responsive to the gyro roll axis synchro output of the gyro platform; for presenting visual roll information on the pilot's cathode ray tube.

3. The device of claim 1, incorporating a video camera, the said camera arranged to employ a pinhole lens, and infrared and/or near infrared illumination means to illuminate the objects scanned by the said video camera.

4. The airborne approach/landing reproducer device and system of claim 1 employing marker beacon energy to transfer by relay input the glide slope signal away from the associated converter meter and subsequently insure radio altimeter output to the associated converter meter.

5. The airborne approach/landing reproducer device and system of claim 1 provided with marker beacon relay mechanism for automatically switching off the received energy from the distance measuring transmitter located at the groundbased runway threshold to that emanting from the distance measuring transmitter located at the far end of the said runway, and visual approach slope boxes located adjacent the threshold of the miniature runway for displaying glide slope angle to the pilot's cathode ray tube by means of the video camera, and means for manually setting the glide slope angle and the runway length of the miniature runway.

* * * * *